Feb. 2, 1926.
F. S. PITT-TAYLOR
CONCERTINA KEYBOARD
Filed Feb. 25, 1925
1,571,431
2 Sheets-Sheet 1
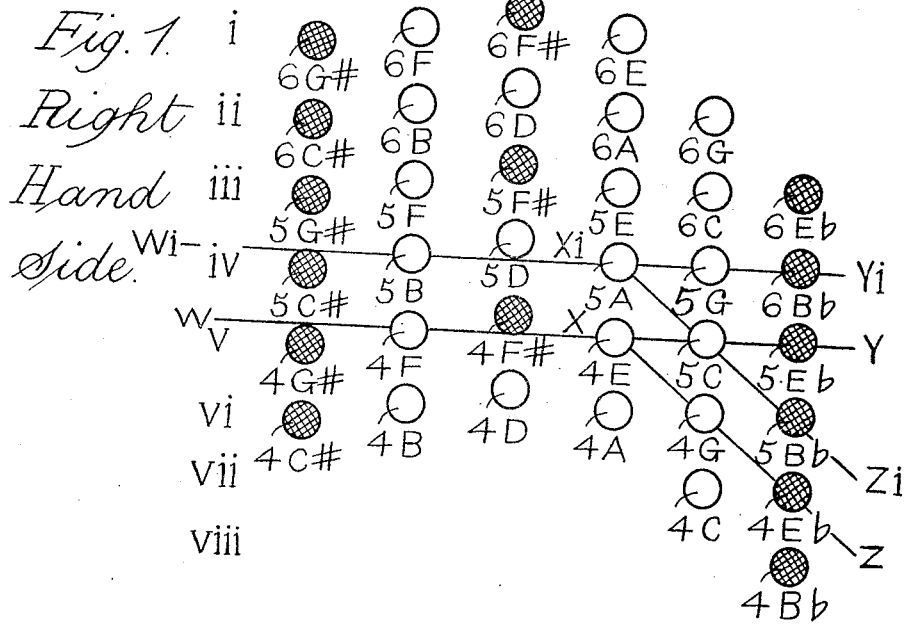
Fig. 1. Right Hand Side.
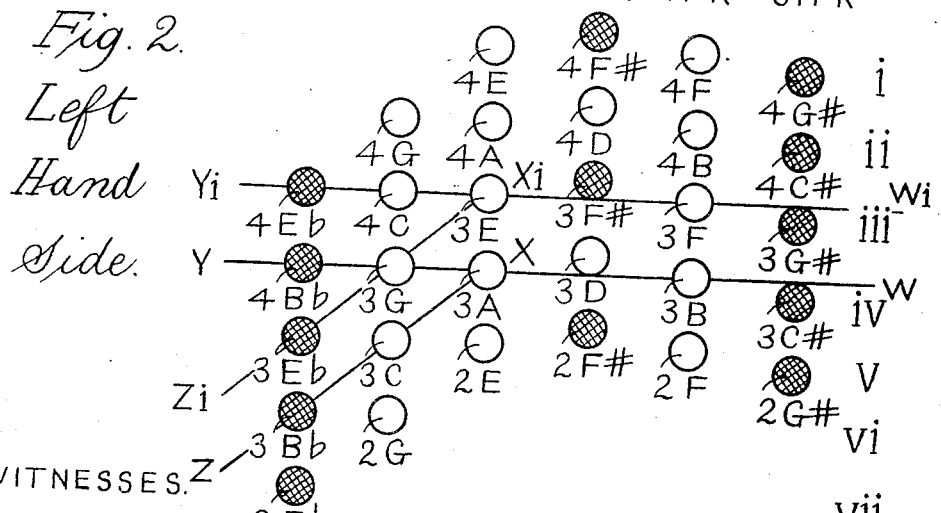
Fig. 2. Left Hand Side.
WITNESSES.
Alice Butcher
Edith Ellen Hanson Hirst
INVENTOR
Francis Stanhope Pitt=Taylor.

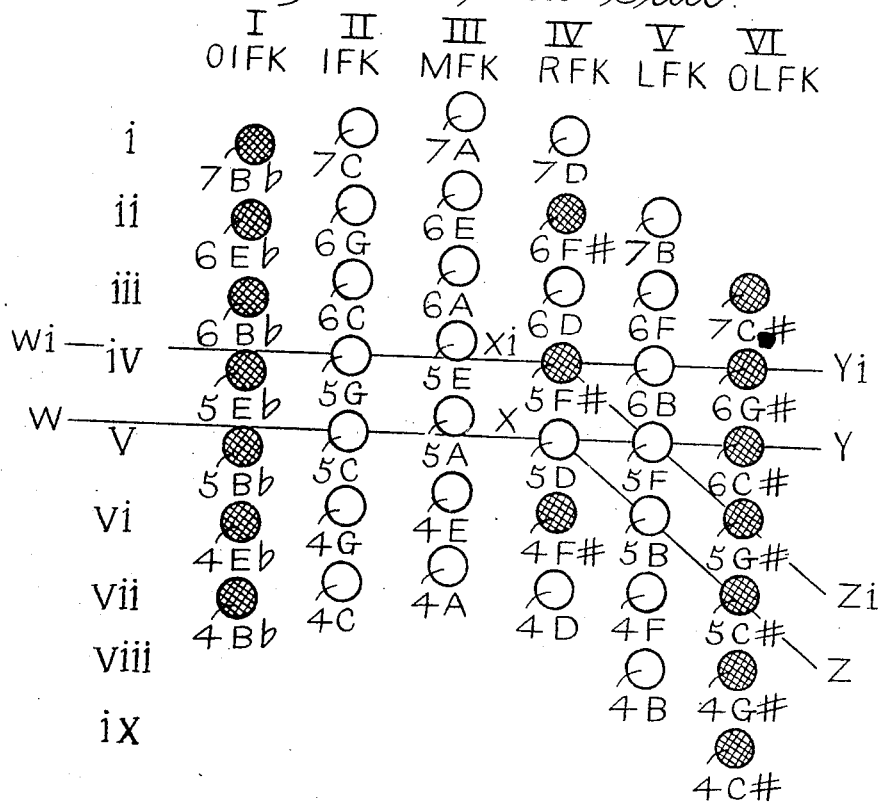

Patented Feb. 2, 1926.

1,571,431

UNITED STATES PATENT OFFICE.

FRANCIS STANHOPE PITT-TAYLOR, OF BLACKPOOL, ENGLAND.

CONCERTINA KEYBOARD.

Application filed February 25, 1925. Serial No. 11,510.

*To all whom it may concern:*

Be it known that I, FRANCIS STANHOPE PITT-TAYLOR, bachelor of medicine and bachelor of surgery, general medical practitioner, a subject of King George V of Great Britain and of the Dominions Beyond the Seas and Emperor of India, residing at 106 Bloomfield Road, Blackpool, in the county of Lancaster, England, have invented new and useful Improvements in Concertina Keyboards, of which the following is a specification.

My invention relates to improvements in the keyboards of concertinas by combining together two inventions, (1) in which the keyboards are particularly adapted to the hands, the one to the one hand, and the other to the other hand of the player, the keys of each keyboard being grouped in parallel rows having six keys in each row in the case of the rows occupying the central portion of each keyboard, the keys being numbered from the left edge of the keyboard, the twelve different notes of each octave being sounded by two sets of six keys, the order of the notes sounded progressing from left to right on the left side, and from right to left on the right side, and each set of six keys being distributed over three transverse rows having six keys in each one in the body of the keyboard, so that the first note on the left side and the last note on the right side of any semi-octave are sounded by the first key of the first of three rows, numbering the rows from below upwards, on the left side, and by the last key of the first of three rows on the right side respectively, the second note on the left side and the penultimate note on the right side are sounded by the second key of the second of the three rows on the left side, and by the penultimate key of the second of the three rows on the right side, and the third, fourth, fifth and sixth notes in each semi-octave are sounded by the third, fourth, fifth and sixth keys of the third of the three rows on the left side, and by the fourth, third, second and first keys of the third of the three rows on the right side, so that any transverse row of six keys contains portions of three semi-octaves, whilst the order of the notes sounded of each octave is regular so that one set of six keys sound the notes A, A sharp, B, C, C sharp and D, and the other set of six keys sound the notes D sharp, E, F, F sharp, G, and G sharp; and (2) the invention of John Hill Maccann, British No. 4752, of 1884, in such a way that modifications of both inventions are made, so that one semi-octave set of keys distributed over three transverse rows are able to sound when pressed the notes A sharp, C, A, D, B, and C sharp, and the other semi-octave set of keys of every pair of such sets of keys distributed over three transverse rows are able to sound when pressed the notes D sharp, G, E, F sharp, F and G sharp, thereby greatly facilitating the playing of scales and chords.

In order that my invention may be easily and clearly understood, the keyboards are illustrated in Figures 1 to 3.

Figures 1 and 3 of the accompanying drawings show the keyboard on the right hand side of the concertina; whilst Figure 2 shows that on the left hand side of the instrument. The compass shown in Figure 2 on the left hand side extends from E flat on the first leger line below the line on the bass staff to G sharp on the third leger line above the line of the same staff; or from E flat in the second octave of a piano-forte commencing its compass with A in the first octave, to G sharp in the fourth octave. The compass shown in Figures 1 and 3 extends from A on the second leger line below the line of the treble staff to G sharp on the fourth leger line above the line of the same staff in the case of Figure 1, but to D on the sixth leger line above the line of the same staff in the case of Figure 3; or from A in the fourth octave to G sharp in the sixth octave or to D in the seventh octave of a pianoforte keyboard.

The keys of each up and down or perpendicular row at right angles to the line of the handrail H. R. besides being labelled with reference to the fingers OIFK or outer index finger key, IFK or index finger key, MFK or middle finger key, RFK or ring finger key, LFK or little finger key, and OLFK or outer little finger key, are numbered on both sides from the left edge of the keyboard with the numbers I to VI placed above the finger labels. Thus in all the figures can be seen six numbered differently perpendicular rows, each row having one of the numbers above it, with six keys in Figure 1, five keys in Figure 2, and seven keys in Figure 3 under each number. Figure 1 shows eight transverse rows WXY, Figure 2 seven, and Figure 3 nine. In all the figures, with the exception of the rows at the extremities, the top two and the bottom two rows, which may be of less plurality of keys, each row in the body of the keyboard has six keys, whilst the top row has the first four keys only on the right side Figures 1 and 3, and the last four keys only on the left side Figure 2, the second row from the top having the first five keys only on the right side Figures 1 and 3 and the last five keys only on the left side Figure 2, the penultimate row having the last two keys only on the right side and the first two keys only on the left side, and the last row having the last key only on the right side and the first key only on the left side. In each figure two transverse rows are seen marked by horizontal lines WiXiYi WXY respectively. Figures 1, 2, and 3 show keyboards containing 36, 30, and 42 keys respectively, but keyboards can be constructed with lesser or greater compass, if desired, upon the same contrivance.

I will now consider in detail the characteristic features of the invention.

First of all I would point out that no claim to novelty is made for the finger-length position of the keys, which is illustrated in the figures, for such is that of the art described in Pitt-Taylor's patent specification British No. 220,824 of the 19th of September, 1923. The novelty of this invention concerns the functions of the keys as reed-sounders, and whereas in that invention the twelve different notes of each octave are sounded by two angular-transverse rows of keys having six keys in each row, each angular-transverse row being formed by the six keys of the semi-octave being distributed over three transverse rows and each octave over four rows so that one angular-transverse row of keys sounds the semi-octave notes A, A sharp, B, C, C sharp and D, and the other angular-transverse row of keys sounds the semi-octave notes D sharp, E, F, F sharp, G, and G sharp, in this invention one angular-transverse row ZXW sounds the notes B flat or A sharp, C, A, D, B, C sharp, and the other angular-transverse row ZiXiWi sounds the notes E flat or D sharp, G, E, F sharp, F, and G sharp.

By this means all the diatonic notes are sounded on the inner four rows, numbered II to V, as in the patent specification British of J. H. Maccann, so that a separate finger is available to sound each diatonic note, and a diatonic scale can be played up or down the keyboard with the greatest possible facility. Moreover, by causing C sharp and G sharp to be sounded on the opposite side to or the furthest side from the keys which sound their naturals C and G instead of on the nearest side as in Maccann's specification, the playing of a chromatic scale is greatly improved, for, instead of the little finger having to be lifted after playing the natural C in order to play the C sharp, the index finger is available to sound the C sharp. Thus a separate finger is found to be available to sound each consecutive note of a chromatic scale with less difficulty than in the regular arrangement of Pitt-Taylor's British patent specification No. 220,824 of 19:9:1923.

In several other respects this invention embodies the advances made by the last invention just alluded to.

(1) The retention of the division of the octave into semi-octaves, one beginning with the note A and the other with the note D sharp, so that all the alterations made are confined within the limits of either semi-octave, and one semi-octave does not encroach upon the other. In fact the three chromatic notes of the second semi-octave are retained unchanged in position, the alterations in this semi-octave being confined to the diatonic notes.

(2) The division of the chromatic notes to suit the variability in the muscular endowment of the fingers is retained, so that there are still two series, one of two notes to be sounded by the little finger, and the other of three notes to be sounded by the index and middle fingers, the work of sounding the chromatic notes being distributed evenly amongst the fingers best fitted to accomplish it.

(3) The division of the chromatic notes musically into the first two flats of the major flat scales, and the first three sharps of the major sharp scales is also retained.

(4) The construction of all the octaves alike is also embodied.

(5) The provision for synchronous movements of the fingers by having the order of the reed-sounders the reverse on the right hand side to that on the left is embodied, Figure 1, so that the same-named finger is able to play the same-named note of the same, greater or lesser compass as the case may be.

The important feature of the British patent specification of J. H. Maccann whereby the semi-octaves exhibit in their perpendicular relationship the intervals of thirds and fifths which are so important in harmony is embodied. By this means, two notes and sometimes even three can be sounded by one finger, such as the fifths D sharp A sharp, CG, AE, BF, and C sharp G sharp and the third D F sharp. Consequently, the chords CEGC, ACEA, BDFB, DF sharp AD, C sharp E G sharp C sharp, and B flat E flat G flat B flat can all be sounded if necessary by two fingers only, and very easily indeed with three. In fact, a complete scale of chords CEGC, DFAD, EGBE, FACF, GBDG, ACEA, BDFB and CEGC can easily be sounded, whereas in the case of the regular order seen in Pitts-Taylor's British patent specification No. 220,824 of the 19:9:1913 the chord DFAD it is impossible to play, and the chord GBDG is difficult to obtain.

Figure 3 gives a picture of the keyboard with the same order on the right side as exists on the left, which is a modification resembling Maccann's in this particular, and those who may desire such a keyboard can have one constructed in such a manner.

It will be observed that the first key on the left side in Figure 2 and on the right side in Figure 3, and the sixth key on the right side in Figure 1 belonging to the first part of one semi-octave-angular-transverse row ZXW of every pair of such rows, the twelve different notes of each octave being sounded by two such rows of six keys, sound the note B flat, and belonging to the first part of the other semi-octave-angular-transverse row ZiXiWi of every pair of such rows, sound the note E flat, that the second key in Figures 2 and 3 and that the fifth key in Figure 1 belonging to the second part of one semi-octave-angular-transverse row sound the note C, and belonging to the second part of the other semi-octave-angular-transverse row sound the note G, and that the third, fourth, fifth and sixth keys in Figures 2 and 3, and that the first, second, third, and fourth keys in Figure 1, belonging to the third part of the one semi-octave-angular-transverse row sound the notes A, D, B, and C sharp, and belonging to the third part of the other semi-octave-angular-transverse row sound the notes E, F sharp, F, and G sharp, and likewise in the case of every pair of such semi-octave-angular-transverse rows, so that the keys of every alternate row sound notes of the same name and in the same position which only differ when they do differ by belonging to octaves of higher or lower position in the treble or bass.

All the figures illustrate keyboards in which the first key in each row is half a key-width below, and the third key half a key-width above the straight line formed by the second, fourth, fifth, and sixth keys on the right side, numbering the keys from the left edge of the keyboard, and in which the fourth key in each row is half a key-width above and the sixth key is half a key-width below the straight line formed by the first, second, third, and fifth keys on the left side.

But I do not limit my invention to such a construction, for if either or neither of the above two keys were half a key-width above or below the straight line formed by the remaining keys, the essential contrivance which constitutes my invention could be applied to the resultant construction, for the essential contrivance is broadly a particular order of notes within two semi-octaves containing six keys in each, and secondarily a particular finger-position of the keys as described above.

I claim:

1. In a concertina keyboard having its keys grouped in parallel rows parallel to the handrail, the rows being placed one above the other so as to form six lines of keys which are perpendicular to the straight line of the handrail, the twelve different notes of each octave being sounded by two rows of six keys, one semi-octave row of every pair of such rows of keys being able to sound when pressed the notes B flat C, A, D, B, and C sharp, and the other semi-octave row of every pair of such rows of keys being able to sound when pressed the notes E flat, G, E, F sharp, F, and G sharp; every alternate row having keys which sound naturals or chromatics of the same name and in the same position that only differ when they do differ, by belonging to octaves of higher or lower position in the treble or bass.

2. In a concertina having two chromatic keyboards as claimed in claim 1 having the notes to be sounded from left to right on the left side, and from right to left on the right side.

3. In a concertina having two chromatic keyboards, one keyboard particularly adapted to one hand, the other keyboard to the other hand of the player, having its keys grouped in parallel rows parallel to the handrail, the rows being placed one above the other so as to form six lines of keys which are perpendicular to the straight line of the handrail, each row in the body of the keyboard having six keys, the twelve different notes of each octave being sounded by two sets of six keys, one set being placed above the other, each set being distributed over three transverse rows of keys and each octave over four rows of keys, so that one note is sounded by one key in one transverse row, another note is sounded by another key in the second transverse row, and the remaining notes in the semi-octave are sounded by the remaining keys in the third transverse row, having one set of every pair to sound the notes B flat, C, A, D, B, and C sharp, and the other set of every pair to sound the notes E flat, G, E, F sharp, F, and G sharp, so that the keys of every alternate row sound notes of the same name and in the same position that only differ when they do differ by belonging to octaves of higher or lower position in the treble or bass.

4. In a concertina having two chromatic keyboards as claimed in claim 3 having the notes to be sounded from left to right on the left side, and from right to left on the right side.

5. In a concertina as claimed in claim 3 with the first key of each row being half a key-width below the straight line formed by the remaining keys on the right side, numbering the keys from the left edge of the keyboard, and with the sixth key of each row being half a key-width below the straight line formed by the remaining keys on the left side.

6. In a concertina as claimed in claim 3 having the notes to be sounded from left to right on the left side, and from right to left on the right side, with the first key of each row being half a key-width below the straight line formed by the remaining keys on the right side, numbering the keys from the left edge of the keyboard, and with the sixth key of each row being half a key-width below the straight line formed by the remaining keys on the left side.

7. In a concertina as claimed in claim 3 with the first key in each row being half a key-width below and with the third key being half a key-width above the straight line formed by the remaining keys on the right side, numbering the keys from the left edge of the keyboard, and with the fourth key in each row being half a key-width above and with the sixth key being half a key-width below the straight line formed by the remaining keys on the left side.

8. In a concertina as claimed in claim 3 having the notes to be sounded from left to right on the left side, and from right to left on the right side, with the first key in each row being half a key-width below and with the third key being half a key-width above the straight line formed by the remaining keys on the right side, numbering the keys from the left edge of the keyboard, and with the fourth key in each row being half a key-width above and with the sixth key being half a key-width below the straight line formed by the remaining keys on the left side.

Signed at Blackpool, in the county of Lancaster, England, on the ninth day of February, 1925.

FRANCIS STANHOPE PITT-TAYLOR, M. B., CH. B.